July 23, 1968  M. A. HALVERSON ET AL  3,393,595
SHEAR FOR FORMED STRUCTURAL ELEMENTS
Filed March 2, 1966  2 Sheets-Sheet 1
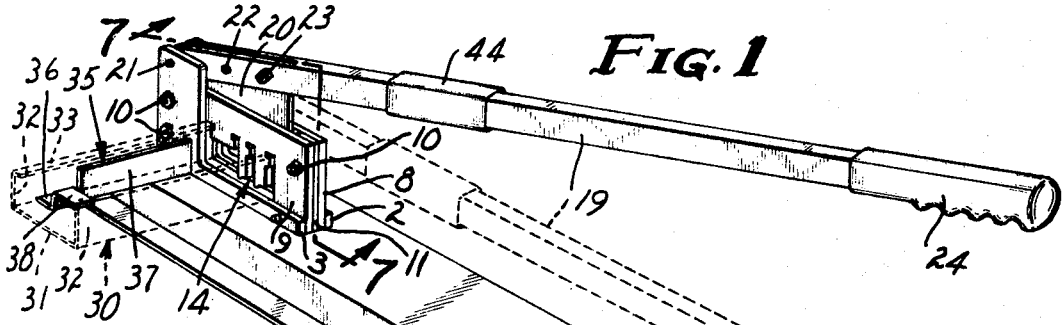
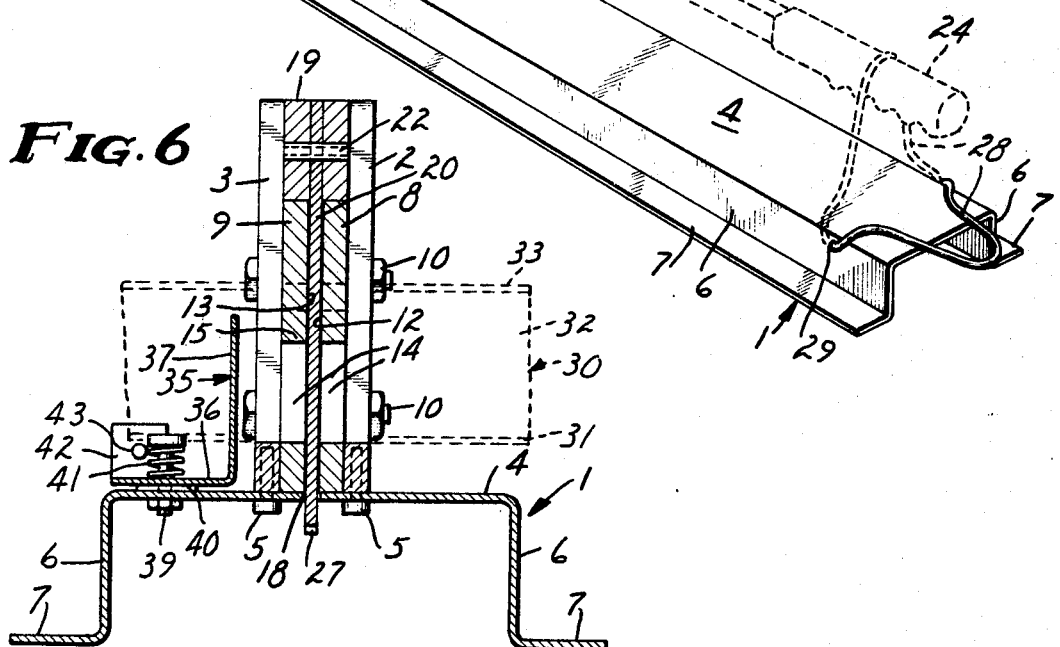
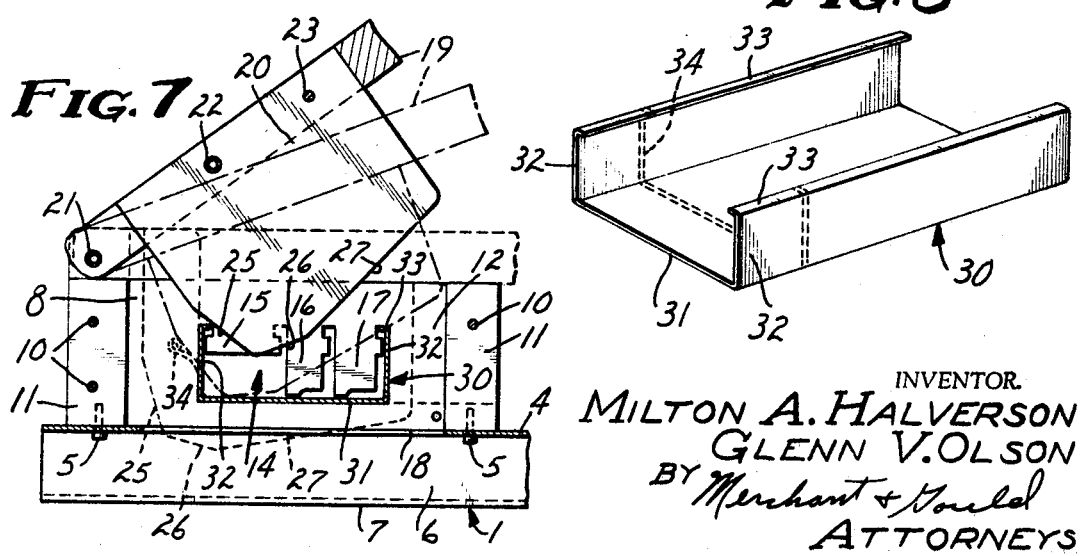
INVENTOR.
MILTON A. HALVERSON
GLENN V. OLSON
BY Merchant & Gould
ATTORNEYS July 23, 1968  M. A. HALVERSON ETAL  3,393,595
SHEAR FOR FORMED STRUCTURAL ELEMENTS
Filed March 2, 1966  2 Sheets-Sheet 2
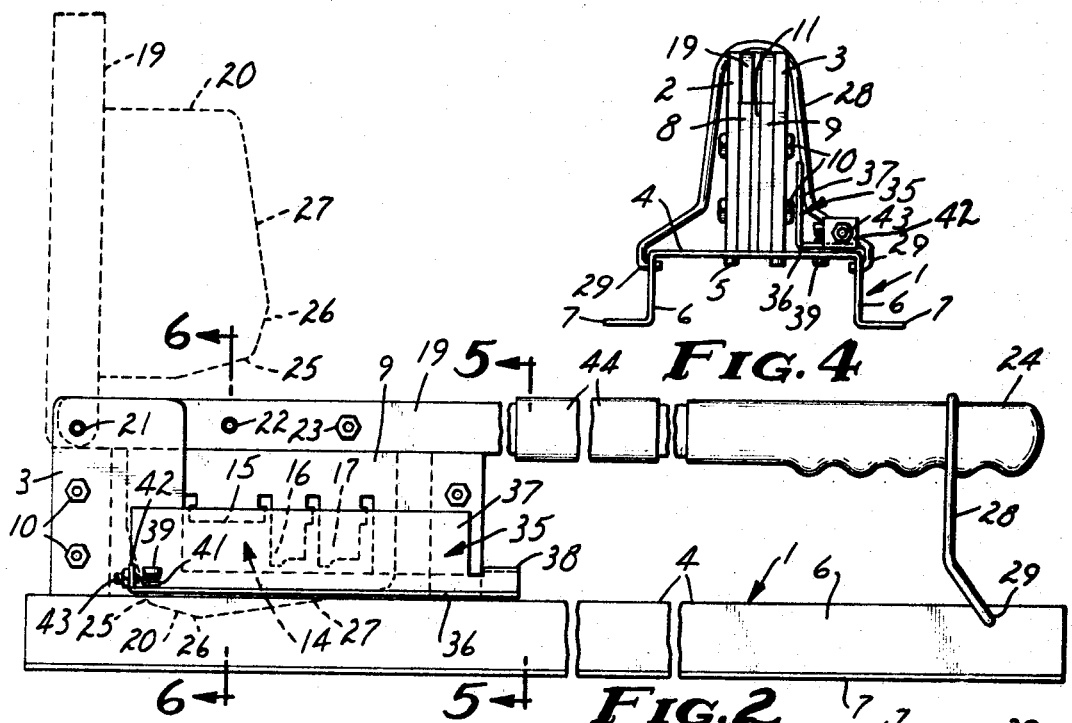
FIG. 4
FIG. 2
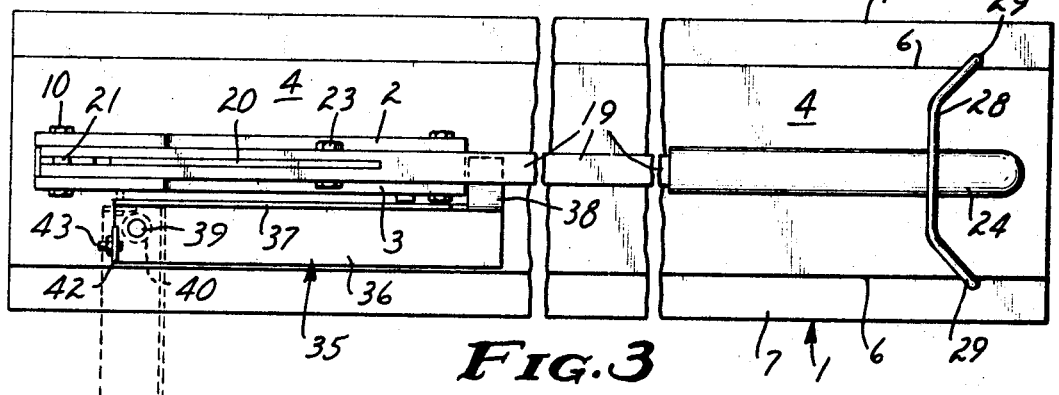
FIG. 3
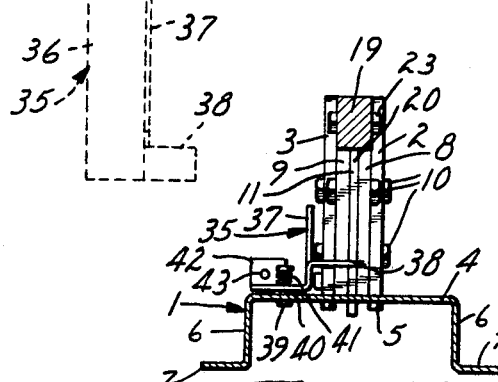
FIG. 5
INVENTOR.
MILTON A. HALVERSON
GLENN V. OLSON
BY Merchant + Gould
ATTORNEYS

United States Patent Office 3,393,595
Patented July 23, 1968

3,393,595
SHEAR FOR FORMED STRUCTURAL ELEMENTS
Milton A. Halverson, 1947 Flandrau Ave., St. Paul, Minn. 55106, and Glenn V. Olson, 1220 Bradley Ave., St. Paul, Minn. 55101
Filed Mar. 2, 1966, Ser. No. 531,312
1 Claim. (Cl. 83—580)

ABSTRACT OF THE DISCLOSURE

A base having a pair of upwardly projecting spaced parallel stationary plates having opposed flat faces and aligned openings transversely therethrough, and a plate-like movable blade having opposite flat surfaces slidably engageable with the opposed flat faces of the stationary blades. A lever, pivotally connected at one end to stationary blade mounting frame members, extends generally longitudinally of the base, the movable blade being rigidly secured to the lever. The lever is provided intermediate its ends with a hand grip, and means is provided for releasably locking the lever in one position of its movement, whereby the lever serves as a carrying handle. The transverse openings have an outline conforming generally to the cross-sectional shape of a structural element to be severed, the movable blade having a plurality of edge face portions each angularly displaced from others of the face portions and disposed at oblique angles to the outline of said transverse openings during material severing movement of the movable blade between the stationary blades.

---

This invention relates generally to cutting devices, and more particularly to shears for cutting sheet material and the like.

In the building trades, structural elements such as eaves, gutters, conduits or channels, and like devices, preformed from sheet metal or other suitable material, usually arrive at the building site or place of installation in predetermined lengths which must be cut to desired measurements for proper fitting. Heretofore, such elements have been cut to the desired shorter lengths by using tinsnips, hacksaws and the like, involving the expenditure of time and energy, and requiring considerable skill to produce smooth square edges to the severed ends.

An important object of this invention is the provision of a shear having a novel cutting blade arrangement whereby preformed structural elements may be quickly and easily severed without deforming the severed ends thereof.

Another object of this invention is the provision of a shear which will accommodate structural elements of various predetermined sizes and shapes.

Another object of this invention is the provision of a shear including a cutting blade having a novel shape whereby to minimize the effort necessary to cut or sever a structural member or device.

Still another object of this invention is the provision of a shear having novel means whereby a member to be cut may be guided and held square and true relative to the cutting means of the shear.

Another object of this invention is the provision of a shear that is light in weight, which is relatively simple and inexpensive to produce, which may be stored in a relatively small space, which is highly efficient in operation, and which is rugged in construction and durable in use.

To the above ends, we provide a shear including a supporting structure, a pair of laterally spaced stationary blades having opposed parallel faces and mounted the supporting structure, the blades having aligned transverse openings through said parallel faces for reception and support of a formed structural element to be severed. The shear further includes a movable blade having opposite generally flat surfaces generally parallel to the opposed faces of the stationary plates and mounted on the supporting structure for movements in opposite directions generally parallel to and between the opposed faces and in substantially face-to-face sliding engagement with opposed faces of the stationary blades. The movable blade defines a plurality of cutting edge face portions each of which is angularly disposed from others of the edge face portions thereof, whereby different edge face portions engage the workpiece or structural element extending through the openings in the stationary blades at oblique angles to the various side portions of the structural element.

The above, and still further highly important objects and advantages of this invention will become apparent from the following detailed specification, appended claims and attached drawings.

Referring to the drawings, in which like reference characters indicate like parts throughout the several views:

FIG. 1 is a view in perspective of a shear produced in accordance with this invention;

FIG. 2 is a fragmentary view in side elevation of the shear of FIG. 1, showing a different position of some of the parts;

FIG. 3 is a view in top plan;

FIG. 4 is a view in end elevation, as seen from the left of FIG. 2;

FIG. 5 is a transverse section taken substantially on the line 5—5 of FIG. 2;

FIG. 6 is an enlarged transverse section taken subtantially on the line 6—6 of FIG. 2;

FIG. 7 is a view partly in side elevation and partly in section, taken substantially on the line 7—7 of FIG. 1, on an enlarged scale; and FIG. 8 is a fragmentary view in perspective of a preformed sheet structural element illustrating one type thereof which may be severed by the shear of this invention.

Referring with greater detail to the drawings, a supporting structure is shown as comprising an elongated inverted generally U-shaped base 1 and a pair of generally upright frame members 2 and 3 projecting upwardly from one end portion of the base 1. The base 1 is formed to provide a top wall 4 on which the frame members 2 and 3 are secured by means of machine screws or the like 5, laterally spaced side walls 6 and laterally outwardly projecting base flanges 7. As shown, the frame members 2 and 3 are generally L-shaped and disposed in laterally spaced parallel relationship generally parallel to the longitudinal dimension of the base 1.

A pair of plate-like stationary blades or die members 8 and 9 are disposed between the frame members 2 and 3 and are each rigidly secured to an adjacent one of the frame members 2 and 3 by nut-equipped bolts or the like 10 that extend through aligned apertures in the frame members and stationary blades, and through a pair of spacer elements 11 at opposite ends of the frame members 2 and 3 and the stationary blades 8 and 9. The stationary blades 8 and 9 are preferably made from hardened steel plates or the like and have flat opposed generally parallel faces 12 and 13 respectively. Further, the stationary blades or die members 8 and 9 define aligned transverse openings therethrough, the openings 14 being identical as to size and outline. As shown, the stationary blades 8 and 9 are formed to provide tongues 15, 16 and 17 which project downwardly from the upper portions of the openings 14 to the lower portions thereof to provide a definite predetermined outline to the openings 14 for a purpose which will hereinafter become apparent. As shown in FIGS. 6 and 7, the top wall 4 of the base 1 is provided with an elongated opening 18 between the stationary blades 8 and 9 and extending between the spacer elements 11.

The outer end portions of the frame members 2 and 3 project upwardly above the adjacent ends of the stationary blades 8 and 9 and provide a bearing support for one end of an elongated operating lever 19 that overlies the base 1 and extends generally longitudinally thereof. The said one end of the operating lever 19 is bifurcated to receive a movable shear blade 20, and is pivotally mounted between the upwardly extended portions of the frame members 2 and 3 by a tubular pin 21, commonly known as a roll pin. The blade 20 is releasably mounted in the bifurcated end portion of the operating lever 19 by means of a second roll pin 22 and a nut-equipped bolt or the like 23.

As shown, the operating lever 19, which is provided with a hand grip 24 at its free end, is movable in directions about the axis of the pin 21 to impart swinging movements to the movable blade 20 between the stationary blades 8 and 9, the movable blade 20 being of a thickness to slidably engage the opposed faces 12 and 13 of the stationary blades 8 and 9. The movable blade 20 is formed to provide a plurality of edge faces 25, 26 and 27 that are angularly displaced from each other and so angularly disposed that each thereof enter the space between the openings 14 at an oblique angle to a given workpiece or structural member supported in the opening 14, during downward movement of the operating lever 19. As shown in FIG. 2, the operating lever 19 is movable between an inoperative position shown by doted lines in FIG. 2, wherein the movable blade 20 is disposed in upwardly spaced relation to the stationary blades 8 and 9, and a second position wherein the operating lever 19 rests upon the top surfaces of the stationary blades 8 and 9, and wherein the movable blade 20 has passed completely between the aligned openings 14 in the stationary blades 8 and 9. The operating lever 19 may be releasably locked in this latter position by a locking yoke 28 having inturned ends 29 that project inwardly through aligned openings in the side walls 6 of the base 1. As shown in FIG. 1, the yoke 28 is pivotally movable about the aligned axes of the inturned ends 29 between an inoperative position substantially parallel to the top wall 4 of the base 1 as shown by full lines in FIG. 1, and an operative handle-engaging position substantially normal to the top wall 4, as shown by dotted lines in FIG. 1, and by full lines in FIGS. 2 and 4.

As above indicated, the shear of this invention is adapted to sever structural elements of sheet metal and the like formed into various cross-sectional shapes and sizes. One such structural element is shown in FIG. 8 as comprising a channel 30 having a bottom wall 31, opposed side walls 32 and inturned flanges 33 at the upper edges of the side walls 32. As shown in FIG. 7, the opening 14 is of a size and shape to fit and support the outer wall surfaces of the channel 30 and, when the operating lever is moved from its full line position of FIG. 7 to its lowermost broken line position of FIG. 7, that portion of the channel 30 that is disposed between the stationary blades 8 and 9 is sheared away by the movable blade 20 without deforming any portion of the channel 30. The sheared-off portion or kerf is shown in FIGS. 7 and 8 by dotted lines, and indicated at 34.

The tongue portions 15, 16 and 17 provide the openings 14 with such outlines that channels 30 of several widths may be supported therein. For instance, a channel 30 may be of such width that one of the side walls 32 thereof may be disposed at the left of the tongue 15, with respect to FIG. 7, the other side wall 32 thereof being disposed between the tongues 16 and 17. A still narrower channel may have said other wall 32 disposed between the tongues 15 and 16. Still further, channels of the same shape as channel 30 but having side walls of less height than that of the side walls 32 may be adequately supported for shearing in the openings 14. In view of the fact that the stationary blades 8 and 9 are secured in place by nut-equipped bolts, removal of the plates 8 and 9 and replacement thereof by others having openings therethrough of different outline, is a very simple matter.

An elongated guide member 35 comprises a generally horizontally disposed base portion 36, a vertically disposed guide wall portion 37 and a horizontally disposed supporting tab or the like 38 disposed at one end of the guide member 35. At the opposite end of the guide member 35, the base portion 36 thereof is drilled to receive a vertically disposed pivot bolt or the like 39 that extends upwardly through the inner end portion of the top wall 4 of the base 1. A bearing washer 40 is interposed between the top wall 4 and the base portion 36, and the adjacent portion of the base portion 36 is yieldingly urged into engagement with the washer 40 by a coil compression spring 41 interposed between the base portion 36 and the head of the bolt 40, see particularly FIG. 6. As shown by full and broken lines in FIG. 3, the guide member 35 is movable about the axis of the pivot bolt 39 between an inoperative position extending generally longitudinally of the base 1 and an operative supporting position normal to the longitudinal dimension of the base 1. At its end adjacent the pivot bolt 39, the base portion 36 is formed to provide an upturned flange 42 that is provided with a lock nut-equipped adjustment screw or the like 43 which engages the adjacent upright frame member 3 when the guide member 35 is moved to its operative guiding position shown by full lines in FIG. 1 and dotted lines in FIG. 3. Manipulation of the screw 43 permits the guide wall portion 37 to be adjusted so as to be in true parallelism with the axis of the aligned openings 14, when the guide member 35 is in its operative work supporting and guiding position. The arrangement is such that, when the guide member 35 is in its operative position, the workpiece engaging portion of the guide wall 37 lies in the same plane as the adjacent sides of the openings 14 in the stationary blades 8 and 9, the top surface of the supporting tab 38 being on a level with the lower sides of the openings 14. Thus, the structural element or workpiece 30 may be supported without tipping in the device during the shearing operation.

It will be noted that, when the operating lever 19 is locked in its full line position of FIG. 2 and the guide member 35 is moved to its inoperative position, the entire tool occupies a relatively small space, so that the same may be easily stored in a tool chest or the like. For ease in carrying the tool from place to place, we provide a rubber-like sleeve 44 which encompasses the operating lever 19, intermediate the ends thereof.

A distinct advantage of the above described shear resides in the arrangement of the stationary blades 8 and 9. After prolonged use, the cutting edges thereof adjacent the movable blade 20 become dulled. When this occurs, it is a simple matter to remove the bolts 10 and the blades 8 and 9, replacing the same at opposite sides of the movable blade 20. Thus, the sides of the stationary blades 8 and 9 which were remote from the movable blade 20 become positioned adjacent the movable blade, providing a new set of cutting edge portions.

This invention has been thoroughly tested and found to be completely satisfactory for the accomplishment of the objectives set forth; and, while we have shown and described a commercial embodiment of our novel shear, it will be understood that the same is capable of modification, without departure from the spirit and scope of the invention, as defined in the claim.

What is claimed is:

1. A portable shear for formed sheet structural elements comprising:
   (a) an elongated inverted generally U-shaped base having a flat top wall and a longitudinally extended slot through said top wall adjacent one end of said base;
   (b) a pair of generally L-shaped parallel frame members secured to said base and projecting upwardly from said top wall adjacent opposite sides of said slot;
   (c) a pair of laterally spaced parallel stationary blades disposed between and removably secured to said frame members, said stationary blades having opposed flat parallel faces and aligned transverse openings to said faces for reception and support of a formed sheet structural element to be severed, said openings having an outline conforming generally to the cross-sectional shape of structural elements to be severed;
   (d) an operating lever extending substantially the length of said base and pivotally connected at one end to said frame members adjacent one end of said base;
   (e) a movable blade having opposite flat surfaces parallel to said opposed flat faces and rigidly secured to said lever for swinging movements in opposite directions toward and away from said slot between and in face-to-face sliding engagement with said opposed flat faces of said stationary blades responsive to swinging movements of said lever on the axis of its pivotal connection to said frame members;
   (f) said movable blade having edge face means substantially normal to said opposite surfaces for engagement with a structural element within said transverse openings and responsive to movement of said movable blade between said stationary blades to shear away that portion of said structural elements which is disposed between said opposed faces, said edge face means comprising a plurality of edge face portions each angularly displaced from others of said edge face portions and disposed at oblique angles to the outline of said openings during operating severing movement of said movable blade between said stationary blades;
   (g) means for releasably locking said lever in a material severing position to said base member;
   (h) and a hand grip on said lever intermediate the ends thereof, whereby said lever provides a carrying handle when locked in said severing position.

References Cited

UNITED STATES PATENTS

| | | | |
|---|---|---|---|
| 683,289 | 9/1901 | John | 83 |
| 1,595,706 | 8/1926 | Carlson | 30—262 X |
| 2,090,548 | 8/1937 | Nielsen | 83—605 |
| 2,355,320 | 8/1944 | Nebel | 83—608 |
| 2,695,059 | 11/1954 | Ernst | 83—199 |
| 2,779,409 | 1/1957 | Becker | 83—608 X |
| 3,220,294 | 11/1965 | Bradburn | 83—580 |

ANDREW R. JUHASZ, *Primary Examiner.*